Dec. 18, 1951     G. PICCOLI     2,579,202
PERFUME CONTAINER AND DISPENSER
Filed April 6, 1948     3 Sheets-Sheet 1
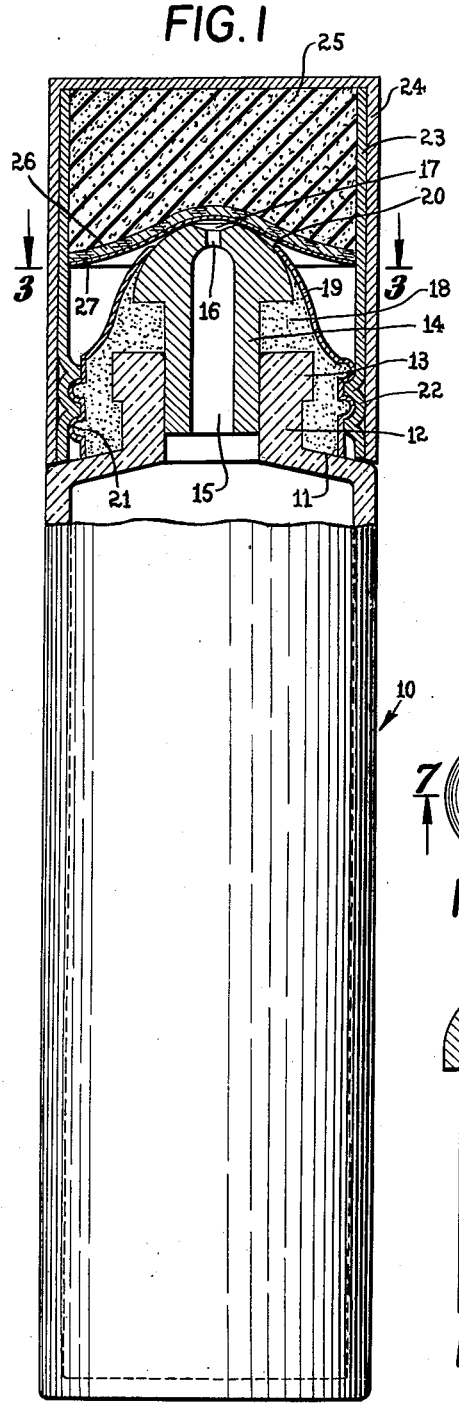
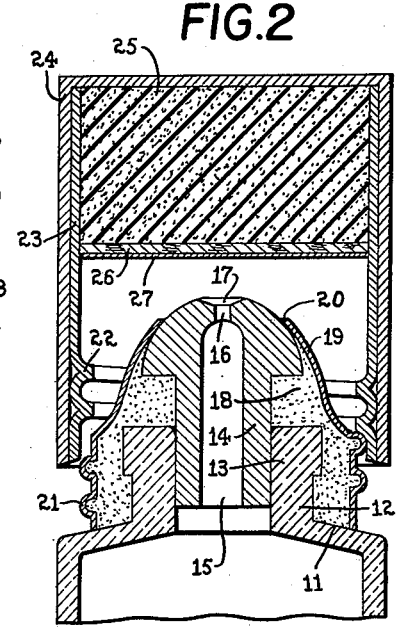
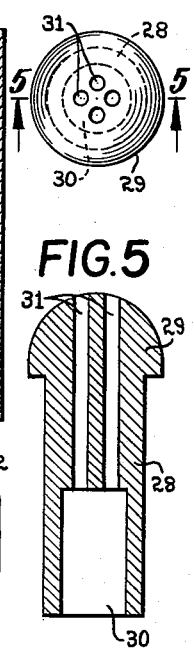
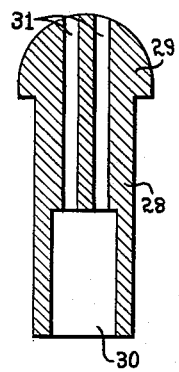
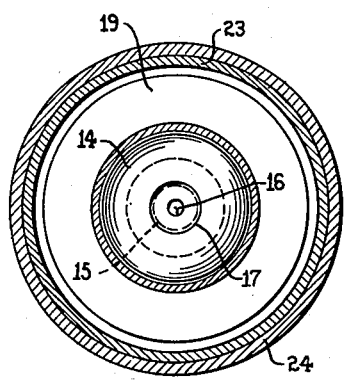
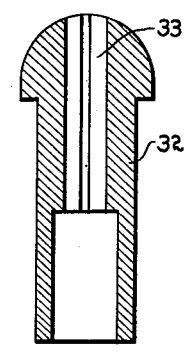
INVENTOR.
GIROLAMO PICCOLI
BY
*H. C. Lesesne*
ATTORNEY Dec. 18, 1951  G. PICCOLI  2,579,202
PERFUME CONTAINER AND DISPENSER Filed April 6, 1948  3 Sheets-Sheet 2

INVENTOR.
GIROLAMO PICCOLI
BY
ATTORNEY

INVENTOR.
GIROLAMO PICCOLI
BY
ATTORNEY

Patented Dec. 18, 1951

2,579,202

UNITED STATES PATENT OFFICE 2,579,202

PERFUME CONTAINER AND DISPENSER

Girolamo Piccoli, Croton on Hudson, N. Y., assignor to Fabergé, Inc., New York, N. Y., a corporation of New York Application April 6, 1948, Serial No. 19,397

5 Claims. (Cl. 215—73)

This invention relates to a container for perfume which is adapted to be effectively sealed against evaporation of the perfume, when not in use, and adapted to dispense minute quantities of the perfume whenever desired.

An object of the invention has been to provide a simple and inexpensive, but effective, dispensing device for a small bottle or vial which will bring about the discharge of the liquid contents in small increments and deliver it as a thin film over the surface which is to receive the liquid.

A further object has been to provide, in conjunction with the dispensing device, a simple and inexpensive, but effective, means for sealing the container against loss of its contents, either by leakage or by evaporation.

It has been a further object to provide devices and means of the character indicated which present a neat and attractive appearance, in keeping with the relatively expensive contents of the bottle or vial.

In the packaging and dispensing of perfumes, a particularly difficult problem is involved because of the high volatility of the perfume and its low viscosity. Another problem has been to provide a dispensing device, of the character indicated, which will function properly at all times, regardless of the extent to which the bottle or vial is filled. The invention is especially addressed to these problems.

Other objects, features and advantages of the invention will appear from the detailed description of certain illustrative embodiments of the same which will now be given in connection with the accompanying drawings, in which:

Fig. 1 is an enlarged view, partly in elevation and partly in longitudinal section, of a dispensing container embodying the invention;

Fig. 2 is a view in longitudinal section showing the upper end of the dispensing container with the cap partially removed;

Fig. 3 is a transverse sectional view taken along the line 3—3 of Fig. 1;

Fig. 4 is an enlarged top view of a modified form of plug which may be employed as a dispensing element;

Fig. 5 is a longitudinal section through the modified dispensing element, taken along the line 5—5 of Fig. 4;

Fig. 6 is a top view on an enlarged scale of a further form of dispensing element;

Fig. 7 is a longitudinal sectional view along line 7—7 of Fig. 6;

Figure 8:
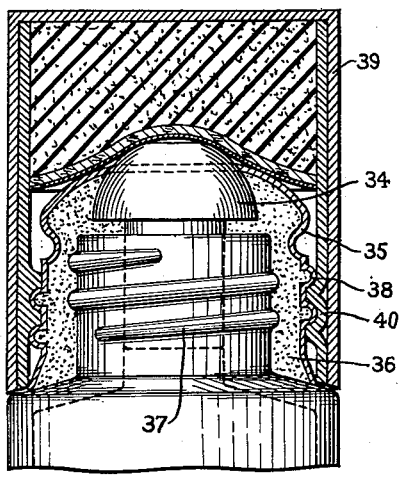
Fig. 8 is an enlarged view in longitudinal section through the upper portion of a modified form of container with its cap.

Referring now to Figs. 1 and 2 of the drawings, the container comprises a bottle or vial 10 formed of glass or any other suitable material. The bottle preferably has an inclined shoulder 11 at its top from which rises a neck 12 having at its outer end a laterally extending flange 13. This flange may, if desired, be provided with a serrated edge adapted to interlock with the cementing material, to be hereinafter described, and thus prevent relative turning between the dispensing closure and the bottle.

The neck 12 is provided with a filling and dispensing opening, which in a 1¼ dram bottle may be about three-sixteenths of an inch in diameter. Into this opening is inserted a plug-like or stopper-like dispensing element 14 having a reduced shank portion adapted to fit snugly into the opening. A sufficiently tight fit should be provided all around the shank to prevent leakage. The diameter of the shank may, if desired, be slightly greater than that of the opening, so that upon insertion of the element the material is squeezed slightly to provide a tight fit. The dispensing element may be formed of any suitable material, but is preferably formed of a relatively soft plastic substance, such as polyethylene of the type sold under the trade name "Polythene." When formed of such material, it may be readily molded into the desired shape and provided, in the course of molding, with the passages to be hereinafter described. Furthermore, such material is sufficiently soft and flexible to be squeezed, in the manner indicated, on insertion of the element into the neck of the bottle. In lieu of polyethylene, vinyl, phenolic, or other resins or glass or metals, or other similar materials may be used to form the plug. If a rigid unyielding material is employed, suitable means should be provided for effecting a good seal between the bottle and the shank of the plug. A cork sleeve may, for example, be used for this purpose.

This dispensing element has a relatively large passage 15 extending upwardly through at least a portion of the shank, so that the latter is tubular in form. At the upper end of the passage a rounded, dome-like shoulder may be formed from which a small opening 16 extends through the top of the plug to the exterior. Opening 16 should be of extremely small diameter, i. e. preferably about forty-thousandths of an inch, so that the perfume or other contents of the bottle will not normally be discharged, even upon inversion of the bottle. On the other hand, if the bottle is shaken, while inverted, the contents may be discharged, drop by drop. Also, if the outer surface of the dispensing element is rubbed across the surface to which the perfume is to be applied, a thin film will be dispensed. Even the simple application of the end of the element to a surface, without relative movement, will cause a small increment of the liquid to be dispensed. The wall of the plug through which the opening 16 extends should be sufficiently thick to provide a passage long enough to accomplish the indicated purpose. If it is too short, the liquid may be discharged upon a simple immersion of the bottle, even though the opening is small, and when applied to a surface the rate of discharge will be faster than desired. A certain amount of frictional resistance to flow should be provided and the flow of air into the bottle as the liquid is dispensed should be arrested.

The outer end surface of the dispensing element is preferably smooth and spherical but may be provided with a countersunk portion 17, concentric with the opening 16, to facilitate the spreading of the perfume or other contents of the bottle over the surface to which the dispensing element is applied. By appropriately selecting the size of the opening 16 and the length of the passage which it forms, the rate of discharge of the perfume may be accurately regulated. It will be found that the rate of discharge is somewhat greater when the bottle is nearly empty than when it is substantially full. By selecting the appropriate dimensions for the opening, both as to diameter and length, the variation in the dispensing rate may be held to a minimum. In general, it may be said that the length of the passage should be greater than its diameter. Depending upon the requirements as to rate of discharge, the passage may have a diameter of between .020 and .050 inch and a length of between .030 and .500 inch.

To retain the dispensing element 14 in fixed relation cementing material 18, such as plaster of Paris, dental cement or the like, may be provided. This, as shown, may be interlocked with the shoulder provided by the flange on the neck of the bottle as well as a shoulder formed by the expanded head of the dispensing element. The latter prevents the element 14 from being forced into the bottle. It is surrounded and retained by a metal shell or cap 19, preferably formed of brass, which may, if desired, be gold plated to present an attractive appearance. In the formation of the assembly, the shell is applied over the cementing material while the latter is still soft and a portion of the cementing material is squeezed out at the lower edge of the shell until the latter engages the shoulder 11 of the bottle. The top of the shell 19 is preferably dome-shaped and is provided with a central opening 20 which receives the dome-shaped top of the dispensing element. As the cementing material 18 hardens and sets a firm and permanent assembly of the parts is effected.

The bottom of the shell is formed to provide a substantially cylindrical skirt in which screw threads 21 are rolled. These are adapted to cooperate with corresponding threads 22 formed internally in a sleeve 23 carried by a removable cap 24. The sleeve 23 and cap 24 may be formed of any suitable material, preferably of a type readily capable of being drawn and shaped, such as brass, and the outer surface of the cap is preferably gold plated. Sleeve 23 has a tight, pressed-fit within the cap so that it is held in place firmly by friction.

In the top of the cap suitable sealing means is provided, this being preferably in the form of a sponge rubber pad 25 having a layer of cork 26 provided with an outer layer of metal foil 27 formed of aluminum, tin or the like.

If desired, a somewhat smaller cap may be used for the bottle and in that event the sealing means in the base of the cap is preferably simply in the form of a cork disc having a layer of aluminum foil or the like on its exposed face. An advantage of this arrangement, moreover, is that it permits the cap to be screwed tight against the shoulder 11 of the bottle and still insures effective sealing of the opening 16 at all times. Sleeve 23 may, if desired, be provided with an inwardly directed flange at its upper or inner end which is arranged to engage the outer edge portion of the sealing means to lock it in place. In this event the sleeve will, of course, be shorter than shown.

Referring now to Figs. 4 and 5, there is shown a modified form of plug adapted to serve as a dispensing element or flow regulator. This, like the member 14, is preferably molded from a suitable plastic, such as polyethylene. It is provided with a shank 28, adapted to fit snugly into the opening through the neck of the bottle, and an enlarged head 29 having a dome-shaped or spherical outer surface. The lower end of the shank is provided with a relatively large recess 30, having a diameter of about 1/8", from which extends a series of smaller passages 31. Four such passages are illustrated. These are of such small diameter and such length that the perfume or other liquid will not be discharged through them upon the mere inversion of the bottle. On the other hand, when the outer end of the plug is applied to or rubbed across a surface, such as a part of the skin, the liquid will be dispensed at a slow rate to form a thin film. This, of course, is with the bottle in its inverted position. It has been found for this purpose that the openings should be between .020 and .050 of an inch in diameter, preferably about .030 of an inch. The passages should have a length between 1/4 and 3/4 of an inch. As indicated with respect to the first embodiment, by appropriate selection of the diameter and length of the restricted passages, the rate of flow of the liquid may be properly regulated and the variation in the rate of flow, as between a nearly full bottle and a nearly empty bottle, may be held within satisfactory limits. When the bottle is nearly full, it will be appreciated that the air space is relatively small so that the withdrawal of a small amount of the liquid tends to produce an appreciable drop in the pressure of the entrapped air. As the bottle becomes nearly empty this effect is greatly reduced. By giving the passages a suitable length the change in the effect upon the entrapped air has only slight influence upon the rate of discharge of the liquid.

In Figs. 6 and 7, a further modified form of dispensing element or flow regulator is shown. This, in principle, is quite similar to the embodiment of Figs. 4 and 5. However, in lieu of the series of separate circular passages, element 32 is provided with a single passage 33, this being of cross-formation in cross-section. The width of each arm of the cross is somewhat less than the diameter of the passages 31 so that the liquid will not be discharged upon the mere inversion of the bottle, but it will be discharged upon the application of the outer end of the dispensing element to a surface, when the bottle is inverted. Passage 33 should be of suitable length, preferably about ⅜ of an inch when the arms of the cross have a width of about .030 of an inch.

Fig. 8 illustrates the application of the invention to a bottle having a threaded neck, in lieu of the flanged neck of Fig. 1. In other respects this embodiment of the invention may be similar to that shown in Fig. 1. A dispensing element 34, of any of the types hereinabove described or of other similar character, may be inserted in the opening in the neck of the bottle and a shell 35, formed of metal, may be applied over the dispensing element and neck. This shell may be filled with cementing material 36 which interlocks with threads 37 on the bottle neck and with threads 38 on the shell. A removable closure cap 39 may be provided, this having internal threads 40 adapted to cooperate with the threads 38.

Figure 9:
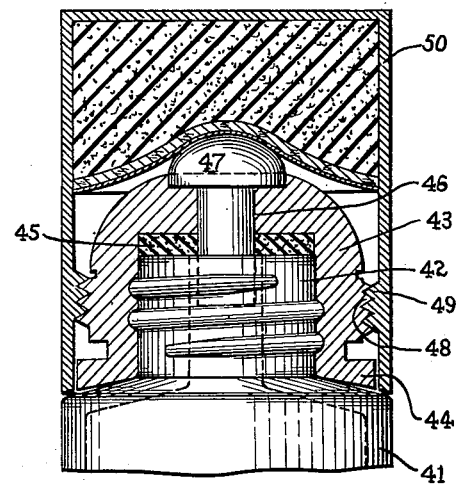
Fig. 9 is a similar view of a further modified form of container and cap, the container in this instance being refillable.

In Fig. 9 a refillable bottle embodying the invention is shown. Bottle 41 may suitably be provided with a screw-threaded neck 42 adapted to receive and retain a detachable head 43. The latter may be formed of any suitable material, such as metal, or a phenol condensation product, or other plastic substance, or a ceramic or porcelain type of material, or the like. It is provided with internal screw threads adapted to cooperate with those on the bottle neck. Its bottom 44 is preferably so formed as to conform with the shape of the shoulder at the top of the bottle. A gasket 45, formed of cork or other suitable material, is provided between the end of the bottle neck and the inner surface at the top of the head to prevent leakage of the contents of the bottle between the neck and the head. The head 43 has an opening axially aligned with the opening 46 through the neck of the bottle, but preferably of somewhat smaller diameter. In this opening is inserted a dispensing element or flow regulator 47 which may be similar to any of the types hereinbefore described. This dispensing element may, as shown, extend some distance downwardly into the neck of the bottle. Screw threads 48 provided around the skirt portion of the head 43 are adapted to cooperate with internal threads 49 provided on a removable cap 50. The arrangement should be such that turning of the cap 50 will bring about its removal from the head rather than the unscrewing of the latter from the neck of the bottle. Any suitable means may be employed to insure greater frictional resistance to the turning of the head on the bottle neck. Within the cap 50 suitable sealing means is provided, as in the Fig. 1 embodiment. With this construction it will be understood that after the contents of the bottle has been discharged the head 43 may be removed and the bottle readily refilled and then the parts may be reassembled, as shown.

Figure 10:
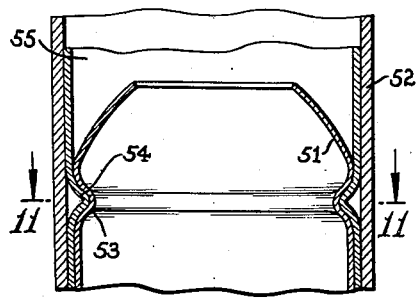
Fig. 10 is a fragmentary, enlarged view in axial section through a modified form of closure and cap.
Figure 11:
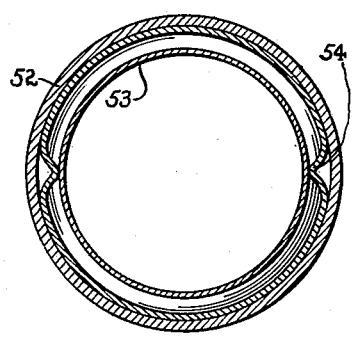
Fig. 11 is a transverse sectional view along the line 11—11 of Fig. 10.
Figure 12:
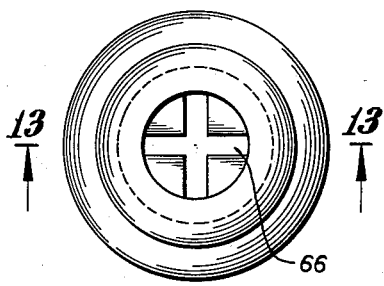
Fig. 12 is a top view of the main outer member of a two-part dispensing element.
Figure 14:
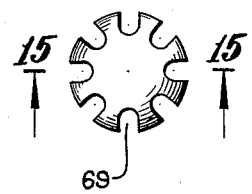
Fig. 14 is a top view of an inner member of the two-part dispensing element.
Figure 13:
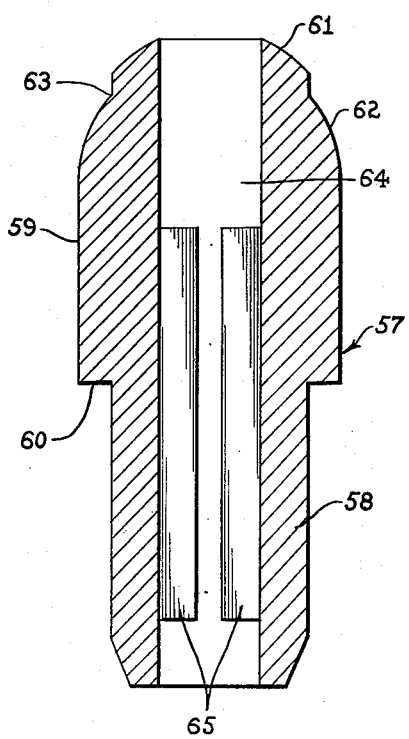
Fig. 13 is a longitudinal section through the member of Fig. 12, taken along the line 13—13.
Figure 15:
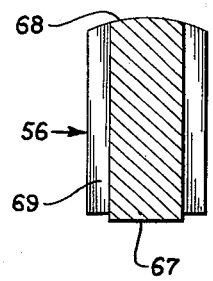
Fig. 15 is a longitudinal section through the member of Fig. 14, taken along the line 15—15.

Referring to Figs. 10 and 11, there is illustrated a snap fastening arrangement between a shell 51 and a removable cap 52. The shell 51 corresponds with the shell 19 of Fig. 1. Thus, in lieu of providing this shell with screw threads to cooperate with corresponding threads on the removable cap, it is simply provided with an annular groove 53 adapted to cooperate with a pair of projections or teats 54 carried by a sleeve 55, similar to sleeve 23, within the removable cover. The metal of the shell 51 and of the member 55 will yield sufficiently to permit the required snap action.

Figs. 12 to 15, inclusive, illustrate a two-part dispensing element or flow regulator which may be used in lieu of any of the one piece dispensing elements described above. It has the advantage of being more easily manufactured in large quantities with uniform results. This dispensing element is formed by inserting the part 56, shown in Figs. 14 and 15, in the opening at the top of the part 57, shown in Figs. 12 and 13. Part 57 has a shank portion 58 having, preferably, a beveled lower end and adapted to fit tightly in the dispensing opening of the bottle. An enlarged head portion 59 of the part 57 provides a shoulder 60 between which and the outer end of the neck of the bottle the cementing material is introduced, as in the Fig. 1 embodiment. It will be understood that the modified plug may be permanently affixed to the bottle in the same manner as the plug of Fig. 1. The outer end of the part 57 is preferably formed with a spherical surface 61 and below this with a second spherical surface 62 which may suitably be of the same radius of curvature as the surface 61 but struck from a different center. This serves to provide a shoulder 63 against which the edge of the opening in the shell, similar to 19 of Fig. 1, may rest while the end of the plug projects through the opening in the shell. Part 57 is provided with a relatively large, axially extending passage 64 throughout its length. However, intermediate the ends of the passage it is provided with a series of inwardly extending sector-like ribs 65 which give to a portion of the length of the passage a cross-like configuration, as indicated at 66 in Fig. 12.

The inner part 56 of the composite plug has its bottom surface 67 forced against the top surfaces of the ribs 65. When so forced into the opening 64 the outer end 68 of part 56 is adapted to complement the spherical surface 61. In the outer surface of the part 56 any suitable number of grooves or flutes 69 is provided. Eight such flutes are shown. These are of suitable width and depth to provide channels having the characteristics of the smaller passages hereinabove described in connection with the other embodiments.

In a typical example, the outer part 57 of the plug has been made about ⅝ of an inch in length. The passage 64 has been made .090 of an inch in diameter and the sectors 65 have been such as to provide a cross-like passage whose arms have a width of .030 of an inch. Part 56 has an outside diameter of .090 of an inch and is retained by the outer part simply by friction resulting from the force fit. The flutes or channels 69 have been formed with a diameter of .020 of an inch and have been cut into the surface to a depth of .024 of an inch. The ribs formed between the flutes terminate at a slight distance, of say .025 of an inch, up from the surface 67. This serves to provide a small annular pocket at the base of the part 56 from which the perfume may be supplied to all of the channels 69. Similarly, the ribs 65 terminate inwardly of the lower end of part 57 so as to provide a small pocket at this point.

Figure 16:
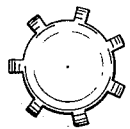
Figs. 16 and 17 are top views of modified forms of inner members having different forms and numbers of flutes.
Figure 17:
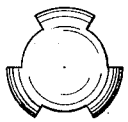

In Fig. 16 the inner member of the plug is shown as formed with seven flutes of a somewhat different configuration which is capable of being more easily formed, i. e., the mold may be more easily produced. The flutes in this form may be of a depth of say .010" in depth and have a mean width of say .030". In Fig. 17 the flutes may also be easily formed and each may have a depth of say .015" and a mean width of .045".

Very satisfactory results have been obtained with various plugs in which the combined cross-sectional area of the plurality of restricted passages is about .003 of a square inch and in which the length of each passage is about .2 of an inch. The total area may, however, vary between about .001 and .005 of a square inch and the length may vary between about .1 and .6 of an inch.

While several illustrative forms of the invention have been explained in considerable detail, it will be understood that various changes may be made in the construction and arrangement of the several parts of the device and the dimensions indicated may be varied somewhat without departing from the general principles and scope of the invention. Features explained in connection with one embodiment may be used in relation to another.

What I claim is:

1. A dispensing container for perfume and the like which comprises a bottle having a shoulder and a projecting neck provided with a dispensing opening, a stopper-like member formed of a soft, non-metallic, organic plastic material and having a portion inserted in said opening and substantially closing the same, said portion upon being forced into said neck serving to effect a good seal in relation to said neck, said member having a passage therethrough extending from the inner end thereof to a point at the exterior surface thereof, at least a portion of said passage having such a restricted cross-section that none of the liquid will be discharged upon the mere inversion of the container and only the desired limited flow of the liquid will be permitted therethrough as the container is inverted and the end of said member is drawn across a surface to be wetted, a rigid cap surrounding said member and said neck of the bottle with the lower end of said cap in engagement with the shoulder of the bottle, said cap having an opening in its top through which a portion of said member surrounding said passage projects, said member firmly engaging said cap around the periphery of said opening, and cementing means filling said cap around said member and neck to secure the several parts in permanently assembled relation.

2. A dispensing container for perfume and the like which comprises a bottle having a shoulder and a projecting neck provided with a dispensing opening, a stopper-like member formed of a soft, non-metallic, organic plastic material and having a portion inserted in said opening and substantially closing the same, said portion upon being forced into said neck serving to effect a good seal in relation to said neck, said member having a passage therethrough extending from the inner end thereof to a point at the exterior surface thereof, at least a portion of said passage having such a restricted cross-section that none of the liquid will be discharged upon the mere inversion of the container and only the desired limited flow of the liquid will be permitted therethrough as the container is inverted and the end of said member is drawn across a surface to be wetted, a rigid cap surrounding said member and said neck of the bottle with the lower end of said cap in engagement with the shoulder of the bottle, said cap having an opening in its top through which a portion of said member surrounding said passage projects, said member firmly engaging said cap around the periphery of said opening, cementing means filling said cap around said member and neck to secure the several parts in permanently assembled relation, said cap having screw threads in its outer surface, an outer cap having internal screw threads engaging said threads on the first mentioned cap, and sealing means in said outer cap adapted to seal said passage.

3. A dispensing container for a liquid comprising a bottle having a neck with a dispensing opening, a head surrounding said neck and having an opening therethrough aligned with said dispensing opening, interlocking means on said neck and head for detachably retaining said head on said neck, a plug formed of polyethylene snugly fitted within the opening in said head and retained by said head, said plug having an outside diameter greater than the inside diameter of the opening in said head and having a passage therethrough communicating with the interior of said bottle and extending to the outer end of said plug, said passage being sufficiently large adjacent the inner end of the plug to provide a yielding thin walled section readily insertable in the opening in said head and said passage having a portion thereof so restricted in cross-section as to prevent the discharge of the liquid upon the mere inversion of said bottle while enabling the dispensing of the liquid as a thin film upon movement of the outer end of said plug along a surface, said head having threads on its outer surface, a cap provided with complementary internal threads adapted for detachable connection with said head, and sealing means within said cap adapted yieldingly to engage the outer end of said plug when said cap is applied to said head for sealing said passage.

4. A dispensing container for a liquid which comprises a bottle having a dispensing opening, a plug formed of polyethylene fitted tightly within said opening and substantially closing the same, said plug having an outside diameter greater than the inside diameter of said opening and having a sufficiently large passage at its inner end to provide a yielding thin walled section readily insertable in said opening, a smaller passage communicating with said large passage and extending through a more rigid wall section to the outer end of said plug, said smaller passage being of such dimension that the liquid will not be discharged therethrough upon mere inversion of said bottle but being capable of dispensing the liquid as a thin film upon rubbing the outer end of the plug across a surface, a rigid cap surrounding said member and said neck of the bottle with the lower end of said cap in engagement with the shoulder of the bottle, said cap having an opening in its top through which a portion of said member surrounding said passage projects, said member firmly engaging said cap around the periphery of said opening, and cementing means filling said cap around said member and neck to secure the several parts in permanently assembled relation.

5. A dispensing container for perfume and the like which comprises a bottle having a shoulder and a projecting neck provided with a dispensing opening, a stopper-like member formed of a soft, non-metallic, organic plastic material and having a portion inserted in said opening and substantially closing the same, said portion having an outside diameter greater than the inside diameter of said opening and upon being forced into said neck serving to effect a good seal in relation to said neck, said member having a passage therethrough extending from the inner end thereof to a point at the exterior surface thereof, said passage being sufficiently large at the inner end of said member to provide a yielding thin walled section readily insertable in said opening and being restricted above said inner end to provide at least one smaller channel extending through a more rigid wall section, said smaller channel having a cross-sectional area of between .0003 and .002 square inch and a length of between .25 and .75 of an inch, a rigid cap surrounding said member and said neck of the bottle with the lower end of said cap in engagement with the shoulder of the bottle, said cap having an opening in its top through which a portion of said member surrounding said passage projects, said member firmly engaging said cap around the periphery of said opening, and cementing means filling said cap around said member and neck to secure the several parts in permanently assembled relation.

GIROLAMO PICCOLI.

REFERENCES CITED

The following references are of record in the file of this patent:

UNITED STATES PATENTS

| Number | Name | Date |
|---|---|---|
| 407,464 | Armbruster | July 23, 1889 |
| 433,937 | Fuller | Aug. 12, 1890 |
| 951,419 | Eberley | Mar. 8, 1910 |
| 965,165 | Dunnock | July 26, 1910 |
| 1,452,801 | Goodchild | Apr. 24, 1923 |
| 1,459,230 | Matre | June 19, 1923 |
| 1,599,348 | Rieser | Sept. 7, 1926 |
| 1,601,829 | Hinkson | Oct. 5, 1926 |
| 1,633,424 | Themak | June 21, 1927 |
| 1,674,626 | Slick | June 19, 1928 |
| 2,001,426 | Kaps | May 14, 1935 |
| 2,113,848 | Lui | Apr. 12, 1938 |
| 2,149,378 | Winslow | Mar. 7, 1939 |
| 2,387,955 | Tilson | Oct. 30, 1945 |
| 2,388,169 | McAleny et al. | Oct. 30, 1945 |
| 2,416,069 | Scott | Feb. 18, 1947 |
| 2,480,247 | Jamison et al. | Aug. 30, 1949 |

FOREIGN PATENTS

| Number | Country | Date |
|---|---|---|
| 22,221 | Netherlands | Jan. 15, 1930 |
| 184,439 | Great Britain | Nov. 23, 1922 |